Patented Apr. 14, 1953

2,635,113

UNITED STATES PATENT OFFICE 2,635,113

MANUFACTURE OF BIS(ALKOXY-BENZ-AMIDO)-STILBENE-DISULFONATES

Richard Raymond Merner, Wilmington, Del., assignor to E. I. du Pont de Nemours and Company, Wilmington, Del., a corporation of Delaware No Drawing. Application October 27, 1950, Serial No. 192,606

11 Claims. (Cl. 260—507)

This invention relates to improvements in the manufacture of bis(alkoxy-benzamido)-stilbene-disulfonates such as disodium bis(2,4-dimethoxy-benzamido)-stilbene-disulfonate and related compounds which are useful as fluorescence agents for detergents, paper, etc.

It is an object of this invention to improve the method of recovery of compounds of this type from their reaction mass when the latter contains pyridine, whereby to obtain the desired compounds in a high state of purity. An incidental object is to provide an efficient and economical process for recovering the pyridine in the aforementioned reaction mass. A further object is to provide a process for purifying fluorescence agents of the aforementioned types when manufactured and isolated by other methods. Various additional and useful objects of this invention will become apparent as the description proceeds.

For the sake of simplifying the discussion, 4,4'-bis(2,4-dimethoxy-benzamido)-2,2'-stilbene-disulfonate will be used herein as a typical example, it being understood, however that the invention is not limited to this compound, but applies generally to any member of this group of compounds, for instance the 4,4'-bis(p-methoxy-benzamido)-, 4,4'-bis(2,5-dimethoxy-benzamido)- and 4,4'-bis(2,4,5-trimethoxy-benzamido)-2,2'-stilbene-disulfonates.

A practical method of manufacturing these compounds is described and claimed in Lubs et al., U. S. Patent 2,497,131. According to this method, diamino-stilbene-disulfonic acid and the chosen alkoxy-benzoic acid, e. g., 2,4-dimethoxy-benzoic acid, are brought together in a mixture of toluene or xylene with a tertiary base such as pyridine, in the presence of an acid halogenating agent such as phosphorus oxychloride, phosphorus trichloride or thionyl chloride. Under the influence of this agent, a reaction takes place; one molecule of the carboxy-acid reacts with each amino group of the stilbene compound forming an amide linkage. Pyridine hydrochloride and pyridinium phosphates (probably acid-phosphates) are formed as by-products. The final reaction mass, consequently, contains pyridinium salts of inorganic acids, the dipyridinium salt of the desired fluorescent, free pyridine, and organic impurities which may be due to residues of unreacted initial materials or their decomposition products or similar by-products.

Although the liquid medium in the mentioned patent consists at least partially of an inert organic solvent such as toluene or xylene, it has been found in practice simpler to use pyridine by itself as the solvent medium for this reaction. The practical problem then is to organize the recovery so as to (1) convert the principal reaction product (the fluorescent) into a desirable water-soluble salt, for instance the disodium salt; (2) isolate the same in highest yield and in a state of highest purity; (3) recover the pyridine solvent economically and in maximum yield.

In a somewhat related process in the art, wherein a fluorescent of the above type was prepared in a medium of aqueous pyridine, it has been suggested that the fluorescent be isolated by alkalizing the reaction mass with sodium carbonate, cooling, filtering, washing the crystals with water and recrystallizing from aqueous pyridine containing "Norit." The yields by that process, however, were very low (approximately 35%). Furthermore, it has been my experience that recovery processes of this sort do not result in a product of highest quality, inasmuch as some of the impurities precipitate out with the principal product upon cooling the alkalized mass.

In copending application of Bernard, Serial No. 131,697 (Patent No. 2,616,926), a process of recovery is set forth which involves the following steps: Into the anhydrous reaction mass comprising pyridine as the sole solvent, ammonia gas is passed to convert the pyridinium salts into the corresponding ammonium salts. Ortho-dichlorobenzene is then added and the pyridine is distilled off under reduced pressure. Water is then added, and the ortho-dichlorobenzene is steam-distilled off. To the resulting slurry in the still, which consists essentially of water, the diammonium salt of the disulfonate product, inorganic ammonium salts, and impurities, sodium hydroxide is added, and the mass is filtered to recover the solid product. From the various distillates, pyridine and ortho-dichlorobenzene are recovered. This process constitutes a tremendous improvement over the prior art, but its economy is still far from the highest. Disregarding the fractionations required to recover the two organic solvents, this process has a very long time cycle. Furthermore, some of the impurities precipitate together with the main reaction product, and the product as isolated generally needs further purification.

Now, according to my invention, the aforementioned several objects of this invention are neatly and simultaneously achieved by a simplified procedure which involves a minimum of handling and a very brief time cycle. According to my invention, the reaction mass consisting of pyridine, fluorescent in the form of dipyridinium salt, pyridinium salts of inorganic acids and impurities is treated with aqueous alkali and heated to distil off the pyridine. Several important effects take place during these two simple steps. Firstly, the various pyridinium compounds in the reaction mass are transformed into salts of the metal or inorganic cation corresponding to the particular alkali selected, for instance, sodium, potassium, ammonium, magnesium or calcium, thereby liberating the combined pyridine. Secondly, by virtue of the presence of water, the pyridine distils off as an azeotrope with water, at a temperature below the boiling point of pure water under the conditions obtaining. Thirdly, as the solution being heated becomes depleted in pyridine, the salt of the stilbene disulfonate compound crystallizes out. And finally, I find that the impurities which customarily attend this reaction are more soluble in the hot brine than the salt of the desired principal product, consequently they stay in solution while the fluorescent crystallizes in a very pure state. Hot filtration of the residual aqueous mass, then, neatly separates the crystals of the desired fluorescent from the remaining mass. A simple washing with hot dilute brine and drying is all that remains as the next step, to obtain the final product in a state of the finest quality, ready for the market. Moreover, the time cycle of the entire manufacture, according to my improved recovery process is reduced to a fifth of the previously described process, thereby reducing labor costs and increasing the productivity of the equipment.

As alkali for my improved process I may employ the hydroxides of sodium, potassium, ammonia, magnesium or calcium, depending on which salt of the disulfonate it is desired to produce. The quantity thereof should be sufficient to displace the pyridine from all the pyridinium salts in the reaction mass, including the phosphates, chlorides and disulfonates. Since an aqueous pyridine solution itself has a pH of about 8, the resulting mass will be on the alkaline side. Usually, however, alkalization is carried to the point where an alkaline reaction to Clayton Yellow is produced. The reaction mass may therefore have a pH somewhere between 9 and 12. Higher alkalinity should be avoided, inasmuch as a hot alkaline aqueous medium tends to hydrolyze the amido linkages in the fluorescent produced.

The quantity of water added with the alkali should be carefully calculated. Disodium bis(2,4-dimethoxy-benzamido)-stilbene-disulfonates, and the other related compounds of this series have the peculiar property of forming an unfilterable gel in pure water. That crystallization of the fluorescent occurs in my procedure is due to the formation of sodium chloride or other inorganic salts in the neutralization step. These have a salting-out effect on the disulfonate.

However, for each individual compound of the aforementioned series there is a minimum concentration of salt which will be effective to promote crystallization. It has been found that as the concentration of salt in the drowning liquors decreases, the extent of gelation of the disulfonate increases. For instance, in the case of disodium 4,4'-bis(2,4-dimethoxy-benzamido)-stilbene-disulfonate, the minimum concentration of sodium chloride is about 4%–5% by weight. For any member of this series of compounds, and for any given inorganic salt, the minimum concentration may be determined readily by a simple experiment as indicated hereinbelow.

Salt concentrations above the minimum will not hinder the separation of the desired agent from the aqueous pyridine mass. But inasmuch as products of highest purity are desired, and inasmuch as higher concentrations of salt may force some quantities of the impurities out of solution, it is desirable to keep the salt concentration as near to the minimum as is practicable. As a rule of thumb, for the sake of general guidance, it may be stated that the concentration of salt in the case of sodium chloride should be not less than 4%, not more than 10%, and preferably in the neighborhood of 5%.

In most cases, the mentioned salt concentration is created in the mass automatically through the action of the added alkali upon the pyridine salts occurring in the reaction mass. But where it is found expedient for some reason to employ a relatively large volume of water for alkalizing the pyridine reaction mass, the resultant concentration of salt may be insufficient to reach the minimum value for crystallizing the particular disulfonate on hand. In such cases, the deficiency may obviously be made up by adding salt to the aqueous mass.

Moreover, although my invention was primarily conceived for the purpose of expediting recovery of the fluorescent from a pyridine reaction mass, it will be clear that my invention may also be utilized for purifying a bis(alkoxy-benzamido)-stilbene-disulfonate which is already isolated regardless of the procedure by which it has been produced. Thus, to purify a given compound of the above type according to my invention, the same is simply dissolved in a mixture of water and pyridine containing sufficient salt to exceed the minimum concentration for the given compound. Preferably, the alkalinity of the solution is also to be adjusted to a value between 9 and 12. The solution is then heated to distil off the pyridine, while the desired disulfonate crystallizes out and is to be filtered off hot, washed with hot brine, and dried.

It will be further clear that in this procedure my invention is not limited to pyridine, but that any other volatile organic solvent which is miscible with water at elevated temperatures may be employed. The only condition imposed upon the solvent is that it be distillable from the aqueous mass without boiling off all the water. Consequently, organic liquids which boil below 100° C. are excellent adapted for this purpose. Examples of such liquids are acetone and methyl, ethyl or isopropyl alcohol. On the other hand, liquids of some higher boiling point may also be used, provided they form an azeotrope with water, which will distil off before the bulk of the water is evaporated. Examples of such liquids are pyridine, propanol, normal and secondary butanol, etc.

Without limiting my invention, the following examples are given to illustrate my preferred modes of operation. Parts mentioned are by weight. In all these examples yields of over 90%, and sometimes approaching 100% of the theoretical, were obtained, and the products were of the highest quality as judged by comparison to standards obtained by several recrystallizations of related products obtained by other procedures in the art.

*Part I.—Recovery from a reaction mass*

EXAMPLE 1

To a suspension of 225 parts of pyridine, 37 parts of 4,4'-diamino-2,2'-stilbene-disulfonic acid, and 44 parts of 2,4-dimethoxy-benzoic acid at room temperature, 23.5 parts of phosphorus oxychloride were added. The temperature rose rapidly to 100° C. The suspension darkened and became a clear dark solution while it was heated at the boil for one hour. This solution was cooled slightly to stop the boiling and was poured into a solution of 25 parts of sodium chloride and 131 parts of 30% sodium hydroxide in 500 parts of water at 80°–90° C. A dark solution resulted.

Steam was admitted to this solution and distillation was continued until the pyridine had all distilled and the distillation temperature had risen to that of pure water. During this distillation, sodium 4,4'-bis(2,4-dimethoxy-benzamido)-2,2'-stilbene-disulfonate separated as a bright yellow crystalline product, which was isolated from the hot solution by filtration. Filtration was very fast. The product was then washed with hot 5% brine and dried.

The product was dye-tested against standard material from the process of Bernard's copending application hereinabove referred to, and against material which had been recrystallized. By a spectral measurement of fluorescence in which higher value designate better quality, the product was observed to have a value of 23.0, as compared with 23.7 for the recrystallized material and 19.8 for standard material.

The pyridine distillate obtained above was treated with 40 parts of sodium chloride and 45 parts of 30% sodium hydroxide solution and was extracted with two portions of chloroform totaling 680 parts. The organic layer was fractionated, and 94.5% of the pyridine charged was recovered as anhydrous pyridine.

EXAMPLE 2

The procedure of Example 1 was followed, except that the 25 parts of sodium chloride were omitted. A yield of 93% was isolated. Tested for quality by the same procedure, a value of 24.1 was obtained. Recovery of anhydrous pyridine was 92.6%.

EXAMPLE 3

3050 parts of a condensation mass in pyridine prepared according to the proportions and procedure of Example 1 were mixed with a solution of 1390 parts of 28% ammonium hydroxide in 4150 parts of water, and the pyridine was distilled from the solution. The ammonium salt of 4,4'-bis(2,4-dimethoxy-benzamido)-2,2'-stilbene-disulfonic acid precipitated during the distillation and was separated from the final hot slurry by filtration. The filter cake was reslurried in a hot 5% solution of ammonium chloride in water and pH was adjusted to alkaline to brilliant yellow indicator by the addition of ammonium hydroxide. The slurry was filtered to remove the product. After drying, the product consisted of 790 parts of light tan solid which was determined to be of a high grade of purity and nearly quantitative in yield.

EXAMPLE 4

After the manner of Example 3, 100 parts of the condensation mass were mixed with a solution of 22.3 parts of potassium hydroxide in 150 parts of water and the pyridine was distilled to effect the crystallization of the potassium salt of 4,4'-bis(2,4-dimethoxy-benzamido)-2,2'-stilbene-disulfonic acid. The product was isolated by filtration of the hot slurry to give 26.8 parts of a high purity.

In other experiments, the above procedure was repeated, using 15 parts of calcium hydroxide, and again, using 18 parts of magnesium hydroxide in 200 parts of water, to give respectively the calcium and magnesium salts of 4,4'-bis(2,4-dimethoxy-benzamido)-2,2'-stilbene-disulfonic acid.

EXAMPLE 5

The procedure of Example 2 was followed, except that 51 parts of 2,4,5-trimethoxy-benzoic acid were charged in place of the dimethoxy-benzoic acid. The filter cake of the product was reslurried in 400 parts of hot 5% sodium chloride solution, again isolated by hot filtration, and dried at 100° C. The dried product consisted of 72.7 parts of sodium 4,4'-bis-(2,4,5-trimethoxy-benzamido)-2,2'-stilbene-disulfonate and was determined to have a 99% purity. By a test for quality similar to that of Example 1, this product had a value of 38.4.

EXAMPLE 6

The procedure of Example 2 was followed, except that 36.5 parts of 4-methoxy-benzoic acid were charged in place of the dimethoxy-benzoic acid. Sodium 4,4'-bis(4-methoxy-benzamido)-2,2'-stilbene-disulfonate separated during the distillation in very large crystals. The filter cake was reslurried in 400 parts of hot 5% sodium chloride solution, again isolated by hot filtration, and dried at 100° C. The dried product consisted of 68.0 parts and was determined to have 98.1% purity.

EXAMPLE 7

To a suspension of 282 parts of pyridine, 52.5 parts of 4,4'-diamino-2,2'-stilbene-disulfonic acid, and 57.6 parts of 2,4-dimethoxy-benzoic acid at room temperature was added 29.3 parts of phosphorous oxychloride in 30 parts of pyridine. The solution was heated at reflux for 25 minutes, and was mixed with a solution of 63 parts of sodium carbonate in 500 parts of water. This solution was just alkaline to brilliant yellow indicator. Sodium 4,4'-bis(2,4-dimethoxy-benzamido)-2,2'-stilbene-disulfonate crystallized as the pyridine was distilled, and was separated by filtration. The yield was 93%.

Part II.—Purification of an isolated product

EXAMPLE 8

To 100 parts of a thick paste consisting of about 30% of impure, low quality sodium 4,4'-bis(2,4-dimethoxy-benzamido)-2,2'-stilbene-disulfonate in 5% aqueous brine were added 168 parts of pyridine and 187 parts of water. This slurry became a solution on heating to 60° C. The solution was heated to 90° C. and 0.5 part sodium hyposulfite (Na$_2$S$_2$O$_4$) and 4 parts of activated charcoal were added. The mass was heated at reflux for one-half hour and was then filtered hot through a porous filter aid. To the clear filtrate 20 parts of sodium chloride were added, and the mass was adjusted to Clayton Yellow alkalinity by adding 6 parts of 50% aqueous sodium hydroxide solution. This solution was distilled until all pyridine had been collected; during this time sodium 4,4'-bis(2,4-dimethoxy-benzamido)-2,2'-stilbene-disulfonate precipitated. The solid was collected by hot filtration, and the cake was washed with hot 5% aqueous brine and dried. The dried product was of excellent purity, as judged by dye-test and comparison with material of known purity. A washed filter cake from the initial slurry was of a totally unsatisfactory quality when judged by the same dye-test.

EXAMPLE 9

To 100 parts of low-quality crude sodium 4,4'-bis(2,4 - dimethoxy - benzamido) - 2,2' - stilbene-disulfonate were added 80 parts of acetone and 200 parts of water. After heating to effect solution, 1 part of 30% aqueous sodium hydroxide solution was added to adjust the alkalinity to Clayton Yellow indicator. Ten parts of sodium chloride were added to the hot solution, and the acetone was then distilled with steam. Purified sodium 4,4'-bis(2,4-dimethoxy-benzamido)-2,2'-stilbene-disulfonate was collected by filtering the hot slurry, and was dried at 100° C. The dried product was of excellent quality as judged by dye-test and comparison with material of known purity. When judged by the same dye-test, the initial crude material was of a considerably lower quality.

EXAMPLE 10

The procedure of Example 9 was followed, except that methanol replaced acetone as the low-boiling solvent. Similar results were obtained.

It will be understood that the details of the above examples may be varied widely without departing from the spirit of this invention.

For instance, where the carbonate of a given metal is water-soluble, as in the case of the alkali-metals, the same may be used as alkali in lieu of the corresponding hydroxide. Likewise, in the case of the alkaline-earths and magnesium, the oxide of the metal may be employed in lieu of the hydroxide.

The order of addition of the components of the aqueous solution is not important in this process, nor is the temperature of mixing. Water can be added to the pyridine solution, or pyridine solution to the water, or any other combination of steps may be followed. If desired, the alkali can be added during the distillation of the pyridine; however, if the pyridine solution contains pyridinium salts, the alkali must be added before the end of the distillation to neutralize these salts and free the pyridine.

Although specifically illustrated with methoxy-benzamido compounds, this invention may be applied in the same manner and for the same purpose to other bis(alkoxy-benzamido)-stilbene-disulfonates, for instance the corresponding ethoxy, propoxy, butoxy, amyloxy, or benzyloxy derivatives.

As already mentioned, for each combination of a particular fluorescent and particular metal salt, there exists a critical minimum salt concentration below which the fluorescent is apt to gel instead of forming filterable crystals. Employing a concentration of 8 to 10% will safely put the process above this critical value in all cases. Nevertheless, it is better to operate as near the actual minimum value as is possible, inasmuch as products of highest purity are then assured. Fortunately, the determination of this minimum value is a simple procedure and can be run prior to the actual operation in any given new combination of fluorescent and salt. The following additional examples will illustrate this procedure.

Part III.—Determination of critical salt concentration

EXAMPLE 11

Aqueous solutions containing 3, 4 and 5% sodium chloride were prepared. Slurries consisting of 1 g. of sodium 4,4'-bis(2,4-dimethoxy-benzamido)-2,2'-stilbene-disulfonate in 50 ml. of each of these solutions were heated to the boil and then immediately filtered with suction through two thicknesses of Whatman No. 1, 5.5 cm. filter paper. The time required for the solutions to filter were, respectively, 13 minutes, 2.5 minutes, and 5 seconds. The 4% concentration is considered barely satisfactory to avoid gelation, and 5% concentration is to be preferred. X-ray examination shows the latter product to be crystalline.

EXAMPLE 12

By a procedure identcal with Example 11 but using sodium 4,4'-bis(2,4,5 - trimethoxy - benzamido) - 2,2' - stilbene-disulfonate, the respective filtration times for 3,4, and 5% sodium chlodie solutions were found to be 45, 30 and 15 seconds.

EXAMPLE 13

By a procedure identical with Example 11 but using sodium 4,4'-bis(4-methoxy-benzamido)-2,2'-stilbene-disulfonate, filtration was found to be fast at concentrations as low as 0.5% sodium chloride solution. However, considerable amounts of the fluorescent were soluble at this concentration and separated from the cold filtrate as a gel. Such solubility was restricted at 5% sodium chloride concentrations, and this concentration is to be preferred.

EXAMPLE 14

By a procedure identical with Example 11 and using the same sodium salt of the fluorescent but using solutions of calcium chloride at concentrations of 0.1, 0.25, 0.5 and 1.0%, the filtration times were, respectively, very long (gel), 20 seconds, 10 seconds, and 5 seconds.

The advantages of my invention will now be readily apparent.

This method of isolation of product and recovery of pyridine is unique in its technique of effecting a recrystallization of the product during isolation. Distillation of one component of a binary solvent has taken the place of cooling the solvent to effect crystallization. The solubilizing component of the solvent is distilled, leaving a medium in which the solute is progressively less soluble and from which it crystallizes. It develops that under these conditions, the impurities have a fair degree of solubility in the hot residual medium, so that the product can be isolated free of impurities.

By the practice of the invention, the quality of the product is improved markedly, yields are improved, pyridine recoveries are improved, and the cycle time is greatly shortened. Less reactor space is required. These factors all result in a great economic advantage when this process is used for the manufacture of the mentioned fluorescence agents on a commercial scale.

I claim as my invention:

1. A method of purifying a bis(alkoxy-benzamido) - stilbene - disulfonate which comprises forming a solution of said compound in an aqueous phase consisting essentially of water, dissolved alkali, dissolved ionizable inorganic salts, and a water-miscible organic liquid, said organic liquid being one which can be distilled from an aqueous mass at a temperature below 100° C., the solution thus formed having a pH value not less than 8 and not greater than 12, and the concentration of said inorganic salts in said solution being not less than the minimum required to prevent gelation of said bis(alkoxy-benzamido) compound, distilling off said volatile organic liquid, whereby to obtain a residual hot mass comprising an aqueous salt solution, essentially free of said organic liquids, and crystals of said bis(alkoxy-benzamido)-stilbene-disulfonate, and then filtering said mass while still hot, to recover said crystals.

2. A process as in claim 1, the volatile organic liquid being pyridine.

3. A process as in claim 1, the volatile organic liquid being acetone.

4. A process as in claim 1, the volatile organic liquid being methyl alcohol.

5. A process according to claim 1, the metallic ion of said dissolved salt being one selected from the group consisting of the alkali-metals, the alkaline-earth metals, magnesium and ammonium.

6. A process as in claim 5, the filtered crystals being washed with a hot aqueous solution of the same salt as was dissolved in the aqueous mass.

7. A process for recovering a bis(alkoxy-benzamido)-stilbene-disulfonate from a reaction mass comprising said compound together with impurities and inorganic by-products dissolved in pyridine, which comprises drowning the reaction mass in water containing an alkali in sufficient quantity to displace pyridine from its salts contained in the reaction mass and to give the drowned mass a pH value between 8 and 12, the quantity of water employed being sufficient but not substantially in excess of that required to completely dissolve said alkaline reaction mass at distillation temperature, then heating the drowned mass to distil off substantially all the pyridine, leaving behind a mass consisting of crystals of bis(alkoxy-benzamido)-stilbene-disulfonate and an aqueous solution of substantially all the by-products and impurities of the reaction mass, and filtering said residual mass while hot whereby to separate said crystals from said aqueous solution.

8. A process as in claim 7, the alkali in the drowning water being one selected from the group consisting of the alkali-metal carbonates, alkali-metal hydroxides, alkaline-earth hydroxides, magnesium hydroxide and ammonium hydroxide.

9. A process for removing the pyridine from a reaction mass containing bis(2,4-dimethoxy-benzamido) - stilbene - dipyridinium - disulfonate, pyridine salts of inorganic acids, and free pyridine, which comprises treating the reaction mass with dilute aqueous sodium hydroxide in sufficient quantity to displace the pyridine from its salts and from said disulfonate and to create in said mass a pH value between 9 and 12, the quantity of water in said aqueous sodium hydroxide being sufficient but not substantially in excess of that required to completely dissolve said alkaline reaction mass at distillation temperature, and then heating the mass to distil off the pyridine, whereby to compel said stilbene compound to crystallize out of the mass in the form of the corresponding disodium-sulfonate.

10. The process of producing 4,4'-bis(2,4-dimethoxy - benzamido) - 2,2' - stilbene - disulfonate in the form of disodium salt and in a state of high purity, which comprises forming a solution of a crude 4,4'-bis(2,4-dimethoxy-benzamido)-2,2'-stilbene-disulfonate in an aqueous phase consisting essentially of water, dissolved alkali, dissolved ionizable inorganic salts including sodium chloride, and a water-miscible organic liquid which is distillable from aqueous solution at a temperature below the boiling point of pure water, the solution thus formed having a pH between 9 and 12 and the concentration of sodium chloride in said solution being not less than 4% and not greater than 10% by weight, heating said aqueous solution to distil off substantially all of said volatile organic liquid, whereby to form a residual mass comprising crystals of disodium 4,4' - bis(2,4 - dimethoxy - benzamido) - 2,2' - stilbene-disulfonate and an aqueous solution of sodium chloride and organic impurities, and then filtering said residual mass while hot, whereby to separate said crystals from said aqueous solution.

11. The process of producing 4,4'-bis(4-methoxy-benzamido)-2,2'-stilbene-disulfonate in the form of disodium salt and in a state of high purity, which comprises forming a solution of a crude 4,4'-bis(4-methoxy-benzamido)-2,2'-stilbene-disulfonate in an aqueous phase consisting essentially of water, dissolved alkali, dissolved ionizable inorganic salts including sodium chloride, and a water-miscible organic liquid which is distillable from aqueous solution at a temperature below the boiling point of pure water, the solution thus formed having a pH between 9 and 12 and the concentration of sodium chloride in said solution being not less than 4% and not greater than 10% by weight, heating said aqueous solution to distil off substantially all of said volatile organic liquid, whereby to form a residual mass comprising crystals of disodium 4,4'-bis(4 - methoxy - benzamido) - 2,2' - stilbene-disulfonate and an aqueous solution of sodium chloride and organic impurities, and then filtering said residual mass while hot, whereby to separate said crystals from said aqueous solution.

RICHARD RAYMOND MERNER.

References Cited in the file of this patent

UNITED STATES PATENTS

| Number | Name | Date |
|---|---|---|
| 2,076,217 | Albrecht | Apr. 6, 1937 |
| 2,170,262 | Graenacher | Aug. 22, 1939 |
| 2,186,769 | Schirm | Jan. 9, 1940 |
| 2,299,834 | Martin et al. | Oct. 27, 1942 |
| 2,328,159 | Martin et al. | Aug. 31, 1943 |
| 2,468,431 | Eberhart et al. | Apr. 26, 1949 |
| 2,497,131 | Lubs et al. | Feb. 14, 1950 |
| 2,521,665 | Hausermann | Sept. 5, 1950 |
| 2,563,354 | Munro | Aug. 7, 1951 |
| 2,581,057 | Wirth | Jan. 1, 1952 |
| 2,581,059 | Witte | Jan. 1, 1952 |